3,342,724
LIGHT OIL CONTACT OF THERMAL
CRACKING EFFLUENT
Gordon D. Goering, New York, N.Y., assignor to Phillips
Petroleum Company, a corporation of Delaware
Filed Aug. 3, 1965, Ser. No. 476,934
9 Claims. (Cl. 208—101)

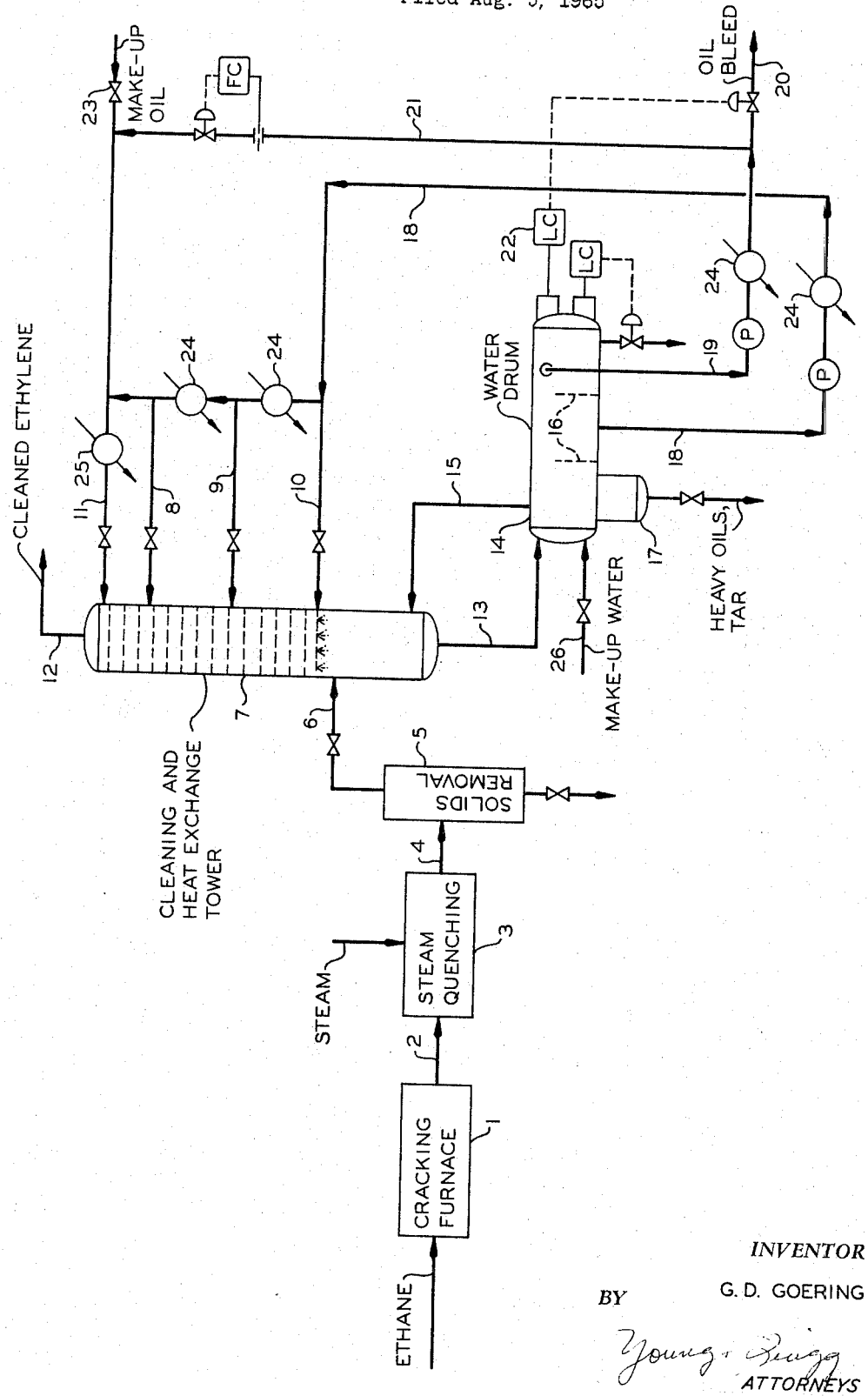

This invention relates to the treatment of a hot reaction effluent.

In one of its aspects, this invention relates to treatment of a hot effluent, e.g., an effluent from the pyrolytic or thermal cracking of a hydrocarbon, by contacting the effluent with a mixture of light oils and water to cool the effluent and remove heavy oils therefrom. In another of its aspects, this invention relates to a method of treating a hot effluent including contacting the effluent with a plurality of water streams to cool the effluent and then contacting the cooled effluent with a mixture comprising light oil and water to further cool the effluent and remove heavy oils therefrom. In another aspect, this invention relates to a method for treating a hot reaction effluent by contacting the effluent with water and steam to reduce the temperature thereof and to discontinue cracking, and then contacting the effluent with a plurality of streams of water to cool the effluent, followed by contacting the cooled effluent with a mixture of oil and water to further cool the effluent and remove heavy oils therefrom. In still another of its aspects, this invention relates to an apparatus for cooling a thermal cracking effluent and removing heavy oils therefrom, comprising in combination a quenching means, a solids removal means, and a direct heat exchange means, wherein the effluent is contacted with both water and a mixture of light oil and water to cool the effluent, and remove heavy oils therefrom.

A known method for making ethylene is by thermal cracking of various hydrocarbon feed stocks such as a gas oil or saturated light hydrocarbons such as ethane, propane and butane. Temperatures required in the cracking of these and other hydrocarbons to produce ethylene give rise to several problems. If the effluent resulting from the thermal or pyrolytic cracking of a hydrocarbon feed stock is allowed to remain at the cracking temperature for an unduly long period, secondary reactions and the formation of undesirable by-products will result. It is, therefore, necessary to cool the effluent from the thermal cracking process as soon as possible after cracking has occurred.

Many methods have been proposed for cooling the thermally cracked effluent. Among these methods are those including contacting the effluent with water, the use of air cooled heat transfer devices, and other cooling methods and media. It has also been proposed to use a mixture of oil and water to cool a reaction effluent from a thermal cracking process. U.S. Patent 2,928,886, Mar. 15, 1960, to Nisbet et al., discloses that a thermal cracking effluent at a temperature of 1472° F. can be contacted with an oil and water emulsion containing from about 5 to about 40 percent of oil. This contacting of the hot thermal cracking effluent effects a temperature reduction of the effluent from about 1472° F. to 212° F. The addition of the oil and water emulsion serves to remove the heavy tar and coke that is contained in the reaction effluent, and therefore prevents fouling of the process equipment into which either the cooling medium or the cooled effluent are introduced. However, there are difficulties in this process, since the oil and water emulsion contacts the reaction effluent at a temperature which will promote cracking in the oil. This cracking of the oil added in accordance with the prior art will produce therefrom additional undesired tarry materials. This not only results in a loss of oil, but also aggravates the tarry material disposal problem. Another prior art patent, U.S. 2,747,680, discloses quenching a thermally cracked effluent with water followed by a cooling and purifying oil; however, this method has as disadvantages the high circulation of this added oil because oil, compared with water, is a relatively poor heat exchange fluid, and dissolved tar has to be separated from this large quantity of circulating oil, e.g., by violatilizing the oil from the tar.

I have now discovered a method whereby the foregoing difficulties and disadvantages of the prior art can be avoided, as hereinafter described.

By various aspects of this invention, one or more of the following or other objects can be obtained.

It is an object of this invention to prevent plugging or fouling in process equipment.

It is another object of this invention to provide a method of economically and simply removing heavy oils from a thermal cracking reaction mixture effluent.

Still another object of this invention is to provide a method to effectively reduce the temperature of the thermal cracking reaction mixture effluent without producing deleterious effects.

Other aspects, objects, and the several advantages of this invention are apparent from a study of this disclosure, the drawing, and the appended claims.

In accordance with the practice of this invention, there is provided a method of cooling and removing heavy oils from an effluent resulting from the thermal cracking of a hydrocarbon feed stock wherein the effluent is contacted with water and steam to cause initial cooling to a temperature below the cracking temperature of the feed stock and the thus cooled effluent is then contacted with a mixture comprising light oil and water to further cool the effluent and remove the heavy oils therefrom, thereby eliminating the deleterious effects caused by the heavy oils.

There is further provided in accordance with the practice of this invention a method whereby a hot effluent resulting from the thermal cracking of a hydrocarbon feed stock is contacted with water and steam to reduce the temperature of the effluent sufficiently to discontinue cracking and the effluent is further treated by removing any solids which are formed therefrom, contacting the effluent with a plurality of water streams, each stream being cooler than the preceding stream to cool the effluent in a step-wise manner, and then contacting the thus cooled effluent with a mixture comprising light oil and water to further cool the effluent and remove the heavy oils and tars therefrom.

There is further provided in accordance with the practice of this invention an apparatus for treating an effluent resulting from the thermal cracking of a hydrocarbon feed stock, the details of which will be hereinafter described.

The present invention is applicable for use in effluents resulting from thermal cracking of a number of saturated hydrocarbons, including ethane, propane, butane, and the like. The invention has particularly been found useful when ethane is cracked to produce ethylene. The heavy oils which are produced in the cracking reaction, are usually heavy aromatics. These oils cause fouling and plugging of process equipment and are removed in accordance with this process.

The light oil used can be a light oil of the type produced when cracking propane to produce ethylene. Light oils which are useful in the practice of this invention are those having an API gravity at 60° F. in the range of about 15 to about 25, and have an initial boiling point in the range of about 150 to about 250° F.

When the thermal cracking effluent is quenched with water and steam as previously described, the quenching operation effects the reduction of effluent temperature to discontinue cracking. Exemplary of such a temperature reduction is the reduction of an effluent having a temperature of from 1500 to 1600° F. to 550 to 650° F.

When the thermal cracking effluent is contacted with water to effect cooling of the effluent, the temperature of the water streams can be any temperature which will cause the contacting step to lower the temperature of the effluent. A presently preferred method is to contact the effluent with a series of water streams, each stream being at a lower temperature than the preceding stream thereby effecting a step-wise cooling action. By contacting the stream with water in this manner, the effluent can be cooled to a temperature below that which would cause cracking of the light oil in the light oil and water mixture.

It is highly significant in this invention that the ratios of light oil to water which will effectively remove the heavy oils and tars from the thermal cracking effluent in the practice of this invention are substantially smaller than the ratios which have previously been used. Although various amounts of light oil in water can be used, the preferred amount of light oil is from about 0.5 to 1.5 volume percent. This smaller quantity of added oil, as compared with the prior art, is bled from the system to prevent buildup of dissolved heavy material. Normally, this bleed stream is so small that it need not be purified and recycled. However, if one desires to recover this oil by vaporizing it from the heavy materials, a very small flash unit is needed as compared with the prior art operation.

The invention will be more fully understood and described with reference to the accompanying drawing which is a schematic diagram of the method and apparatus in accordance with this invention.

Referring now to the drawing, a hydrocarbon such as ethane is introduced into cracking furnace zone 1, wherein the temperature is sufficiently high to cause cracking of the hydrocarbon. The thermally-cracked effluent is removed from furnace zone 1 via conduit 2 and introduced to water and steam quenching zone 3, wherein the effluent is contacted with steam to reduce the temperature of the effluent. Following the temperature reduction in water and steam quenching zone 3, the effluent is removed via conduit 4 and introduced to solid removal zone 5 wherein solids are removed. In the solid removal zone, such solid particles as coke that have been formed in the cracking furnace zone are removed from the effluent. The effluent is then transferred by conduit 6 through cleaning and hat exchange tower 7 wherein the effluent is contacted with water at various temperatures, introduced via conduits 8, 9 and 10, and a water-in-oil mixture introduced by conduit 11, shown located in the top of tower 7. As hereinbefore pointed out, the water introduced by any of conduits 8, 9 and 10 can be of different temperatures than that introduced in any other conduit. The cleaned effluent is removed from cleaning and heat exchange tower 7 by conduit 12.

A mixture of water, light and heavy oils is removed from the bottom of tower 7 by conduit 13 and introduced into water drum 14. Vapors from water drum 14 are returned to the tower 7 by conduit 15. The water drum is divided into compartments by baffles 16 which effect the separation of the various components. Heavy materials are removed by conduit 17. Water removed by conduit 18 can be recycled to be reintroduced into tower 7 by conduits 8, 9 and 10, and the water can be mixed with additional light oil or recycle light oil and introduced by conduit 11 into tower 7. Light oil is withdrawn from water drum 14 by conduit 19. A slip stream of the oil can either be bled out of the system by conduit 20 or the remainder of the oil can be recycled to be reintroduced into the cleaning and heat exchange tower 7 by conduit 21 and conduit 7. The oil level in water drum 14 can be controlled by level controller 22 to control the flow of light oil returning to the system by regulating the amount of oil bled from the system. Make-up oil from other processes and other sources can be introduced into the system via conduit 23.

Various cooling zones may be required on the conduits to cool the materials contained therein. These cooling zones are shown as zones 24 on the drawing. In addition, a refrigeration zone can desirably be used to further cool the water and oil mixture introduced at the top of tower 7. This zone is shown as element 25.

Cleaning and heat exchange tower 7 can be designed to include trays or other suitable contact apparatus. Water introduced into the tower 7 can be introduced by means of spray rings or other suitable water injection apparatus.

The following specific example shows the operation of the invention with respect to the cracking of ethane to form ethylene.

SPECIFIC EXAMPLE

Ethane is introduced to furnace zone 1 where it is cracked. The effluent from furnace zone 1 is at a temperature of about 1525° F. After water and steam quenching, the effluent will have a temperature in the range of 550 to 650° F. Further reduction in temperature is effected, e.g., by radiation, in the solid removal zone 5, and the effluent enters the cleaning and heat exchange tower at a temperature in the range of 500 to 600° F. The flow rates and temperatures of the various streams entering the cleaning and heat exchange tower are shown in Table I:

*Table I*

| Conduit | Flow Rate | Temperature, deg. F. |
|---|---|---|
| 6 | 739,000 s.c.f./H | 500–600 |
| 11 | 110 g.p.m | 55 |
| 8 | 320 g.p.m | 100 |
| 9 | 1,410 g.p.m | 130 |
| 10 | 25 g.p.m | 150 |
| 21 | About 1 g.p.m | 100 |

Cleaned ethylene at a temperature of 60° F. is removed from the top of the cleaning and heat exchange tower. The tower is operated at a slight pressure varying from 7 p.s.i.g. to 9 p.s.i.g. at the bottom. The material removed from the bottom of the tower is at 200° F. and the water drum temperature is also at 200° F. The water to oil ratio of the mixture inserted at conduit 11 is 0.5 to 1.5 volume percent oil. The light oil used in the original and make-up oil in the system has approximately the composition shown in Table II.

*Table II*

| | |
|---|---|
| ° API | 20 |
| IBP | ° F.  172 |
| 5% | ° F.  220 |
| 10% | ° F.  296 |
| 20% | ° F.  438 |
| 50% | ° F.  634 |
| Percent distilled at 700° F. | 81 |

Under the foregoing conditions of continuous operation, only about 10 percent of the oil used in the system is required to be dumped and made up with fresh oil daily.

From the foregoing, it will be apparent that amount of light oils required to remove the heavy oils from the thermal cracking effluent are extremely small, therefore, the process can be operated at costs considerably below those of the prior art systems. It is also apparent that the amount of make-up light oil which is to be added to the system is comparably small, and therefore, the efficiency of the process is demonstrated.

Reasonable variation and modification are possible within the scope of the foregoing disclosure, the drawing, and the appended claims to this invention, the essence of which is there has been provided an apparatus and method for cooling and removing heavy oil from an effluent resulting from the thermal cracking of a hydrocarbon feed stock, by contacting the effluent with a water stream, followed by contacting the thus cooled effluent with a mixture comprising light oil and water to further cool the effluent and remove heavy oils therefrom.

I claim:

1. The method of cooling and removing heavy oil from an effluent resulting from the thermal cracking of a hydrocarbon feed stock comprising:
   (a) contacting the effluent with water and steam to reduce the temperature thereof to discontinue cracking;
   (b) removing any solids from the effluent;
   (c) contacting the effluent with a plurality of water streams, each stream being cooler than the preceding stream to cool the effluent in a step-wise manner; and
   (d) contacting the thus cooled effluent with a mixture comprising light oil and water to further cool the effluent and remove heavy oils therefrom.

2. The method of cooling and removing heavy oil from an effluent resulting from the thermal cracking of a hydrocarbon feed stock comprising:
   (a) contacting the effluent with water and steam to reduce the temperature thereof to discontinue cracking;
   (b) contacting the effluent with a plurality of water streams, each stream being cooler than the preceding stream to cool the effluent in a step-wise manner; and
   (c) contacting the thus cooled effluent with a mixture comprising light oil and water to further cool the effluent and remove heavy oils therefrom.

3. The method of claim 2 wherein the hydrocarbon feed is ethane.

4. The method of claim 2 further comprising the step of recovering the light oil after it has contacted the effluent, and recycling the light oil to be used again in the process.

5. The method of claim 2 wherein said light oil is produced by the pyrolytic cracking of propane.

6. The method of claim 2 wherein said light oil is a mixture of aromatics.

7. The method of claim 2 wherein said light oil has an API gravity at 60° F. of from 15 to 25.

8. The method of claim 1 wherein said mixture comprises from about 0.5 to about 1.5 volume percent oil.

9. The method of claim 2 wherein said mixture comprises from about 0.5 to about 1.5 volume percent oil.

References Cited

UNITED STATES PATENTS

| | | | |
|---|---|---|---|
| 2,747,680 | 5/1956 | Kilpatrick | 55—85 |
| 2,876,865 | 3/1959 | Cobb | 55—85 |
| 2,899,475 | 8/1959 | Davison | 208—101 |
| 2,928,886 | 3/1960 | Nisbet et al. | 260—683 |
| 3,011,966 | 12/1961 | Jahnentz et al. | 55—85 |

DELBERT E. GANTZ, *Primary Examiner.*

HERBERT LEVINE, *Examiner.*